W. H. LARRABEE.
COMPOUND WATER METER.
APPLICATION FILED JUNE 26, 1915.
1,188,360.
Patented June 20, 1916.
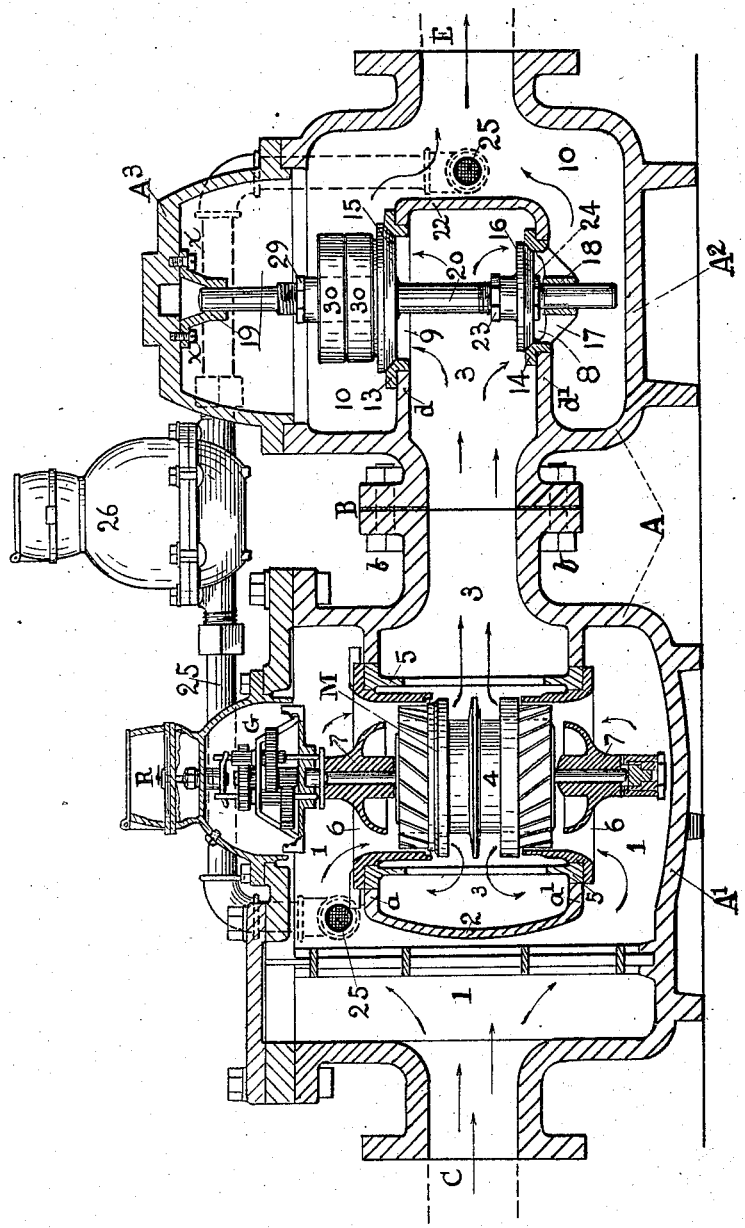
Witnesses —
Ella P. Blenus
Emily F. Burleigh
Inventor —
William H. Larrabee,
By Chas. H. Burleigh
Attorney.

UNITED STATES PATENT OFFICE.

WILLIAM H. LARRABEE, OF WORCESTER, MASSACHUSETTS, ASSIGNOR TO UNION WATER METER COMPANY, OF WORCESTER, MASSACHUSETTS, A CORPORATION OF MASSACHUSETTS.

COMPOUND WATER-METER.

1,188,360.  Specification of Letters Patent.  Patented June 20, 1916.

Application filed June 26, 1915. Serial No. 36,567.

*To all whom it may concern:*

Be it known that I, WILLIAM H. LARRABEE, a citizen of the United States, residing at Worcester, in the county of Worcester and State of Massachusetts, have invented certain new and useful Improvements in Compound Water-Meters, of which the following is a specification.

In practice there are situations where it is required to employ a water-meter capable of measuring and registering a large flow or volume of water with comparative accuracy, but where the demand for such large volume flow comes only at occasional intervals, while in the mean time there is demand for minor flows, the volume rate of which is so small that the larger meter can only register incorrectly or not at all. To meet the requirements of these conditions various attempts have heretofore been made, and different kinds of mechanism have been devised therefor, with more or less success.

The object of my present invention is to provide a practical, convenient and efficient compound meter apparatus constructed essentially as set forth, and which will correctly measure, with but slight loss of head, the occasional large volume flows of water, and at the same time be able to register all flows at a low volume rate accurately, or to the satisfaction of water works officials.

Another object is the embodiment in apparatus for the purpose set forth of means of the character described, adapted to be applied to any water-meter of suitable corresponding class and size to form a compound meter, thereby affording a construction conveniently applicable to be added or combined with a water-meter already in service.

A further object is to provide an apparatus for the purpose described, with an automatically acting valve mechanism and mountings therefor arranged so that said parts are readily accessible for examination, removal or repair, without necessity of disturbing the meter.

My improved compound meter comprises a two part case, or casings, inclosing a primary or inlet chamber that connects with the water-supply pipe; an intermediate passage or chamber; a main metering device for large volume having its measuring wheel arranged between said chambers, to be operated by the flow therethrough; a delivery chamber connected with the exit passage from which the water is drawn or discharged; an automatically-acting valve device controlling the oppositely directed passages or ports from the intermediate chamber to said delivery chamber; an outside by-pass pipe forming an open passage around said meter from the inlet-chamber to the delivery-chamber, and a small or supplemental meter arranged in said by-pass pipe for measuring the water that flows therethrough; said parts being constructed and combined for operation substantially as more fully hereinafter set forth.

The accompanying drawing represents a vertical longitudinal section of a compound water-meter apparatus embodying and illustrating my invention.

In accordance with my invention the inclosing body or main casing A, is preferably formed in two separate sections or body members $A^1$ and $A^2$, that are detachably but firmly secured together, at B, by abutting flanges and bolts $b$ or other suitable attaching spuds. The section $A^1$ contains the inlet chamber 1, a portion of the intermediate passage or chamber 3, which latter is separated from the inlet chamber by an integral barrier, wall or partition 2 having upper and lower horizontal portion $a$ and $a^1$ with openings therethrough in which the main meter mechanism M is supported. Said main meter, which is of high volume capacity to the full extent of the supply conduit, preferably consists, as illustrated, of a peripherally discharging dual wheel 4 mounted to revolve within a suitable cage 5 arranged in the chamber 3 and supported with its ends fitting the openings in the upper and lower portions of the barrier; said cage being provided with bearings 7 for the meter-wheel axle and vortex heads 6 that direct the flow inward against the oblique vanes of the meter-wheel for operating said wheel and the connected registering means as water passes from the inlet chamber 1 into the outflow passage or intermediate chamber 3. Any other suitable form of meter-wheel may be employed, since the particular structure of the wheel is not essentially a part of my present invention.

The casing section $A^1$ is provided with the inlet-spud or flanged member C for connection with the water supply pipe in usual manner; the flow being in the general direction indicated by the arrows.

G denotes the usual train of reducing gearing actuated by the meter wheel, for operating the register mechanism arranged in well known manner within the top casing at R.

The section $A^2$ of the body casing is a valve-containing section, and includes a part of the intermediate passage or chamber 3, and the delivery chamber 10 which is separated from said intermediate chamber by the integral barrier 22 with horizontal upper and lower partitions $d$ $d^1$, and each of which has an opening therethrough fitted with a removable valve-seat, as 13 and 14, providing ports 8 and 9 of full capacity therein. A dual puppet valve device is arranged for controlling the passage or ports between the chambers 3 and 10. Said valve device consists of a vertically disposed stem 20 supported to slide in bearings 18 and 19 near its respective ends, and having valve members 15 and 16 mounted thereon of suitable form and size for matching the respective valve seats 13 and 14. The combined port area for the two valves is approximately equal to double the area of the inlet or supply-pipe, thus giving an unrestricted passage for a full flow of water therethrough. The valves and valve-seats are best made of bronze composition, and their contacting faces ground to a close fitting joint. The valve puppet is freely movable in its bearings.

A by-pass pipe 25, arranged outside the casing and having a small meter 26 connected therein, is provided from the supply-chamber 1 or inlet side of the main meter to the delivery space 10, or outlet side of the valve-chamber; said by-pass being constantly open for the free passage of water therethrough. The internal construction and mechanism of this supplemental meter 26 may be substantially the same as the ordinary types of disk meters, or a meter of any suitable character adapted for measuring and registering a flow of small volume; while the main meter M is adapted for measuring and registering a flow of large volume up to the full capacity of the service conduit.

Respecting the approximate relative sizes of the main service conduit and by-pass, it is suggested that for a four-inch service meter a three-quarter inch by-pass and supplemental meter may be employed; but the relative proportions vary somewhat with the different dimensions of service meters.

The valves 15 and 16 are placed one above the other upon the stem 20, at such distance apart as corresponds with the positions of the valve-seats. The upper valve 15 is of greater diameter and area than the lower valve 16, so that the latter can be removed through the upper valve-seat opening when it is desired to take out the valves, and after taking off the removable cover $A^3$ of the casing. Likewise the valve-seat rings 13 and 14 can be conveniently removed through the upper opening. The bearing 18 for the lower end of the valve stem is best supported by arms 17 in fixed connection with the lower valve-seat ring 14. The bearing 19, for the upper end of the valve stem, is removably attached to the inner side of the casing cover $A^3$ by screws $x$, and can readily be renewed if it becomes worn to an excessive extent. The upper valve is preferably fixed in position upon the stem, while the lower valve is made adjustable, in suitable degree, up or down upon the stem by means of screw threads and nuts 23 and 24; thus permitting regulation that will insure the simultaneous and exact contact of the two valves with their respective seats. The upper valve 15, being of greater area than the lower valve 16, the differential pressure due to the difference in area tends to lift and open the valves when any large volume of water is drawn at the exit. The pressure upon the lower valve assists in holding the valves to their seats when closed; the force on the valve 16 creating a slight hesitation in the action at the instant of opening.

A counterpoise weight, or weights, 30 are arranged upon the valve stem 20 above the upper valve; said weight being adapted to give sufficient force to close the valves when the volume of flow falls below a given minimum quantity, thereby cutting off the main passage and causing all lesser flow to go through the by-pass 25, but not heavy enough to resist the differential upward pressure on the upper valve disk when a larger volume of water is drawn at the delivery outlet E. The weights 30 are preferably made as annular metal disks, which are secured by a nut 29 threaded upon the valve stem. The force can be regulated to counterpoise any given degree of pressure by using a greater or less number of such disks, or disks of greater or less dimensions, as may be used in any instance if desired.

In the operation, when water is being drawn in larger quantities, such as the high duty meter M can correctly register, the valves 15 and 16 open automatically by the differential pressure upward, and the water is free to pass through the apparatus in unrestricted full volume, by way of the main conduit and meter M; some small quantity also flowing through the by-pass way 25 and being registered by the supplemental meter 26. When the amount of water drawn is in such small volume that it can pass the high volume meter without causing said meter to properly register, then since there is practically a similar degree of pressure in the chambers 3 and 10, the differentially actuated valve puppet is depressed by its weight overcoming any slight lifting force due to the small flow of water, and the valves are thus closed, causing the entire limited flow to go from the inlet chamber 1 through the by-pass 25, where it is registered by the supplemental meter 26, without having passed through the main meter M. Hence in no case is the water registered more than once, and by adding the readings of the two registers together the correct amount of all the flow is readily ascertained. The construction and operation is such that the valve opens or closes accordingly as much or little water is being drawn, and acts automatically at a given degree of pressure that indicates high-duty or low-duty, which degree can be made more or less by changing the amount of the counterpoise weights 30.

It will be understood that I do not claim broadly the idea of employing two meters in a water-meter apparatus, together with means for automatically closing the passage from the main meter irrespective of the construction and mode of operation of such mechanism; but

What I claim and desire to secure by Letters Patent, is—

1. A compound water-meter mechanism of the character specified, comprising in combination as described, a two-part main casing each of its parts provided with attaching-spud members, and including, respectively, an inflow chamber and an outflow chamber, said chambers each provided with interior-separating partition walls, with upper and lower portions having openings therethrough, said walls together embracing an intermedial chamber or space extending direct from one of the walls to the other through the adjoined attaching-spud members, the main meter-wheel arranged between the openings from said inflow chamber, valve seats at the openings into said out-flow chamber, an endwise movable central valve-stem slidable in bearings at its upper and lower ends and carrying valve disks that close upon said valve-seats, an outside by-pass meter pipe, and means for connecting the outside by-pass meter pipe into the respective sections of said main casing including said inflow and out-flow chambers.

2. In a compound water-meter mechanism for the purpose described, including in combination, a main meter mechanism, a by-pass pipe around said main meter, a small meter connected in said by-pass pipe, a differential valve-device comprising a central guiding member having upper and lower disks adapted for closing the out-flow passage from the main meter against a given minimum amount of flow, and removably arranged weights thereon whereby said valve may be counter-balanced for opening automatically by difference of pressure on the respective valve disks when the volume of flow exceeds the given minimum.

3. In a compound water meter of the class described, provided with a meter-wheel and automatic resistance valve devices, a two-part body casing, each part including an outer principal chamber and having an internal dividing wall with upper and lower horizontal portions and adapted for the support of the meter-wheel and dual differential resistance valve devices, respectively, said internal walls together inclosing a straight interior chamber horizontally direct from the meter-wheel to the intermedial space between the valve devices; and means for separating and attaching the two parts of said casing at a position transversely across said interior chamber.

4. In a water-meter apparatus of the class described, the body-casing formed in two separate unitable sections, one section including the inlet chamber and a main metering mechanism, the other section including the delivery chamber, and having an internal partition with valve-seats and ports therein opening into said delivery chamber from the out-flow passage of said main meter, an automatically acting dual valve device for closing and opening said ports, said valve having an upwardly and downwardly projecting central stem freely slidable in guides disposed below and above the valve disks for maintaining said valve devise in proper relation to the valve-seats, and means for securing the sections together, and means for connecting with said inlet and delivery chambers a low-volume by-pass and by-pass meter.

5. In a meter mechanism of the character described, the combination with a main water-meter, a casing having an opening at the top thereof, a by-pass conduit and a by-pass meter; of a valve device consisting of a stem having two valve-disks thereon arranged for simultaneously closing upper and lower exits from the out-flow passage of the main meter, and automatically operated by the flow in said passage, one of said valves being adjustable upon the stem, a cover closing said opening at the top of the casing through which said valve can be removed without disturbing the meter mechanism or by-pass devices, said cover carrying the guide for the upper end of the valve spindle.

6. A compound water-meter construction, including the meter-section casing and the valve-section casing separately united by reduced attaching spuds, each section partitioned internally as shown providing an interior chamber and outer surrounding chambers with seats for the meter-wheel mechanism and the valve-mechanism respectively, said surrounding chambers being connected with an external attached pipe having a supplemental meter therein; said interior chamber being disposed in approximately direct alinement with the center of the meter-wheel and axially coincident with the reduced attaching-spuds that unite the two sections of the casing, a concentrically weighted valve member carrying disks that match said valve seats, and guiding means therefor above and below the valve position, all substantially as shown and described.

7. In a water-meter mechanism of the class described, in combination with the high volume meter, the upper and lower ports and valve-seats in the out-flow passage leading therefrom; of a dual valve comprising a central stem with valve members disposed one above the other upon said central stem, the lower valve member being of less diameter than the upper one, and means for regulating the adjustment of one of said valve members in relation to the other upon the stem.

Signed this 25th day of June, 1915.

WILLIAM H. LARRABEE.

Witnesses:
 CHAS. H. BURLEIGH,
 WYANT R. CONVERSE.

Copies of this patent may be obtained for five cents each, by addressing the "Commissioner of Patents, Washington, D. C."